No. 743,216. PATENTED NOV. 3, 1903.
R. A. BACON.
LIGHT EXCLUDING ATTACHMENT FOR CAMERA PLATE HOLDERS.
APPLICATION FILED MAR. 18, 1903.
NO MODEL.
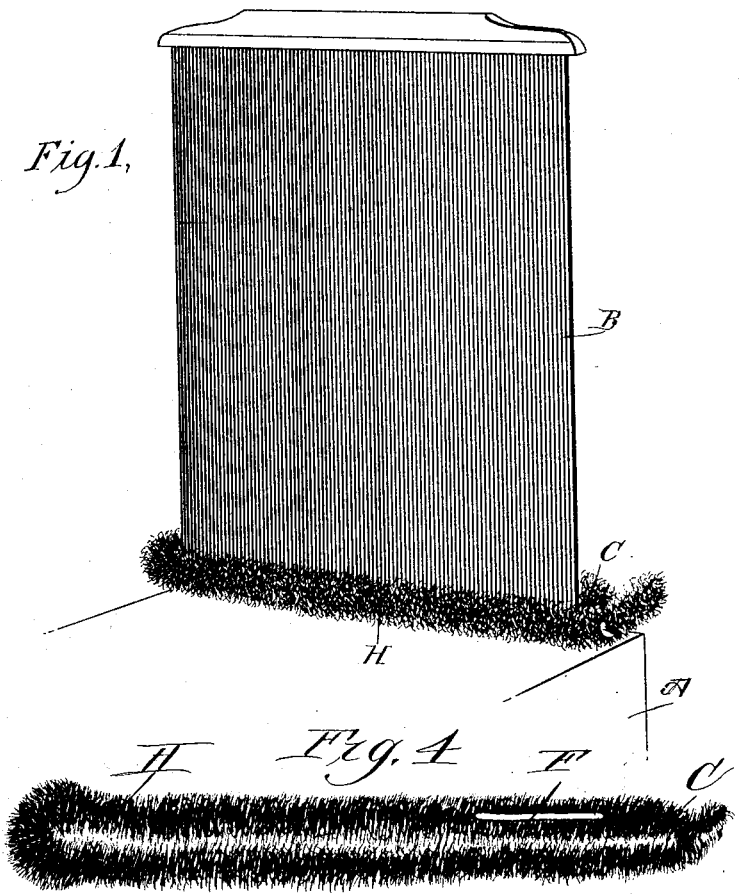
Fig. 1.
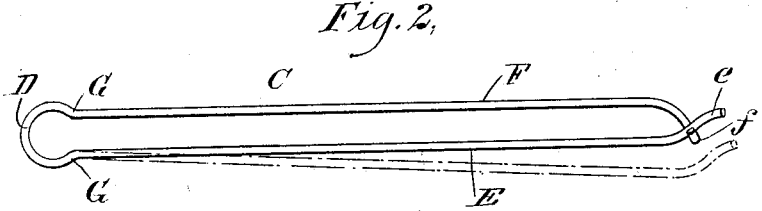
Fig. 4.
Fig. 2.
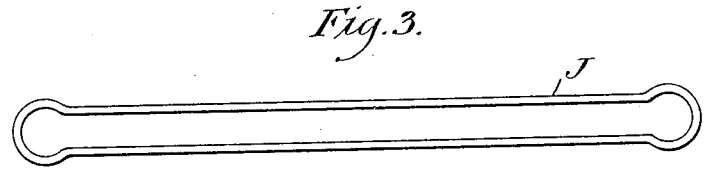
Fig. 3.
WITNESSES:
Edward Thorpe.
R. B. Cavanagh.
INVENTOR
Robert A. Bacon
BY
ATTORNEYS.

No. 743,216. Patented November 3, 1903.

UNITED STATES PATENT OFFICE.

ROBERT A. BACON, OF NEW YORK, N. Y.

LIGHT-EXCLUDING ATTACHMENT FOR CAMERA-PLATE HOLDERS.

SPECIFICATION forming part of Letters Patent No. 743,216, dated November 3, 1903.

Application filed March 18, 1903. Serial No. 148,363. (No model.)

*To all whom it may concern:*

Be it known that I, ROBERT A. BACON, a citizen of the United States, and a resident of the city of New York, borough of Manhattan, in the county and State of New York, have invented new and useful Improvements in Light-Excluding Attachments for Camera Plate-Holders, of which the following is a full, clear, and exact description.

My invention relates to photographic camera attachments, and has particular application to a novel and useful device for preventing photographic plates from becoming light-struck in the plate-holders.

As is well known, many artistic and valuable pictures are entirely ruined through a ray of light striking the plate at the instant the dark slide is withdrawn from the plate-holder, and many attempts have been made to overcome this difficulty, especially by constructing the plate-holder and the dark slides in various ways, but such attempts have met with little or no success.

It is the object of my invention, therefore, to overcome the difficulty above mentioned by providing an attachment which will be exceedingly simple and economic in its construction and one which may be readily used in a camera or a plate-holder in such manner as to effectively exclude every ray of light.

To this end the invention consists in the construction, combination, and arrangement of parts, as is described in this specification, delineated in the accompanying drawings, and set forth in the appended claims.

Reference is to be had to the accompanying drawings, forming a part of this specification, in which similar characters of reference indicate corresponding parts in all the figures.

Figure 1 is a conventional view of a camera and the dark slide of a plate-holder, such view illustrating the manner of employing my improved light-excluding attachment. Fig. 2 is a view showing the wire or metal forming a part of the attachment, and Fig. 3 is a view of a modified form of a supporting-frame. Fig. 4 is a view of the complete light-excluding attachment.

Referring now to the accompanying drawings, A in Fig. 1 designates an ordinary camera-box in connection with which my attachment is designed to be used. The ordinary dark slide of a plate-holder of any well-known type is designated by the letter B and is shown in this view as being withdrawn from the plate-holder in the camera-box.

The improved light-excluding attachment to which this invention particularly relates I have designated as a whole by the letter C, and comprises in the present instance a metallic frame composed, preferably, of wire bent centrally, as at D, so that the two members or arms E and F are of approximately equal length and size. Where the wire frame is bent centrally it is widened or enlarged, so that shoulders G G are formed between said enlarged portion D and the arms E and F, the extremity of the arm E being slightly curved or bent, as shown at $e$, while the opposite arm F is curved to form a hook-like portion $f$, adapted to bear upon and engage with the curved extremity $e$ of the arm E, whereby the two arms are locked together, as shown in Figs. 1 and 2. This frame is adapted to have applied thereto a covering of photographically-dark material, which is shown at H in Fig. 1, the material of said covering being of any soft fluffy character, chenille serving very well for this purpose. The material is applied to the frame so as to entirely cover the same in such manner that it is impossible for a ray of light to pass between the arms E and F of the wire framework when such arms are in their interlocked positions, as shown in Figs. 1 and 2. Before inserting the slide into the plate-holder it is passed into the interlocked arms E and F, so that when the slide has been inserted the full distance within the holder my attachment will rest against the edge of said holder and will prevent any light from passing between the spaces between the slide and the holder and striking the plate, and thereby ruining the same.

While I have in the present instance shown and described one embodiment of my invention, it is of course to be understood that the device may be subjected to modifications and variations without departing from the spirit of the invention. For instance, instead of forming the frame with separate arms, as is shown in Fig. 2, it may be made integral or of any piece in the form of an elongated wire loop, as shown at J in Fig. 3, and any suitable material of a dark color may be employed as the covering for the frame.

Having thus described my invention, I claim as new and desire to secure by Letters Patent—

1. The combination with a plate-holder slide, of a light-excluding attachment removably secured to said slide, said attachment comprising a loop-shaped frame and a covering of light-excluding material for said frame, substantially as set forth.

2. A device of the class described, comprising a wire frame formed with interlocking arm portions, and a soft dark fabric covering said frame, substantially as set forth.

3. A light-excluding attachment for cameras, comprising a frame formed of a metal strip bent centrally whereby to form arm portions, and a widened head portion, the ends of said arms being curved to interlock, and a covering of dark material for said frame, substantially as set forth.

In testimony whereof I have signed my name to this specification in the presence of two subscribing witnesses.

ROBERT A. BACON.

Witnesses:
WM. H. COOPER,
W. D. MENKEN.